(12) United States Patent
French et al.

(10) Patent No.: US 10,819,973 B2
(45) Date of Patent: Oct. 27, 2020

(54) SINGLE-PANEL HEAD-MOUNTED DISPLAY

(71) Applicant: Fat Shark Technology SEZC, George Town (KY)

(72) Inventors: Gregory French, Shenzhen (CN); Allan Evans, George Town (KY)

(73) Assignee: Fat Shark Technology SEZC, George Town, Grand Cayman (KY)

( * ) Notice: Subject to any disclaimer, the term of this patent is extended or adjusted under 35 U.S.C. 154(b) by 8 days.

(21) Appl. No.: 16/002,200

(22) Filed: Jun. 7, 2018

(65) Prior Publication Data

US 2019/0320165 A1 Oct. 17, 2019

(30) Foreign Application Priority Data

Apr. 12, 2018 (CN) .......................... 2018 1 0324925

(51) Int. Cl.
*H04N 13/344* (2018.01)
*H04N 13/128* (2018.01)
*G06T 15/08* (2011.01)
*G02B 30/27* (2020.01)
*H04N 13/00* (2018.01)

(52) U.S. Cl.
CPC .......... *H04N 13/344* (2018.05); *G02B 30/27* (2020.01); *G06T 15/08* (2013.01); *H04N 13/128* (2018.05); *H04N 2013/0081* (2013.01)

(58) Field of Classification Search
CPC ............... H04N 13/344; H04N 13/128; H04N 2013/0081; G02B 27/2214; G06T 15/08
See application file for complete search history.

(56) References Cited

U.S. PATENT DOCUMENTS

| 4,518,231 A | * | 5/1985 | Muchel | G02B 21/22 359/377 |
| 5,282,085 A | * | 1/1994 | Volkert | G02B 21/22 359/377 |
| 5,757,546 A | | 5/1998 | Lipton et al. | |

(Continued)

FOREIGN PATENT DOCUMENTS

EP 2174513 11/2011

OTHER PUBLICATIONS

Partial European search report from European Application No. 19159958.8, dated Sep. 18, 2019.

(Continued)

*Primary Examiner* — Abderrahim Merouan
(74) *Attorney, Agent, or Firm* — Jacobsen IP Law; Krista S. Jacobsen

(57) ABSTRACT

Disclosed herein are head-mounted displays comprising a display screen and an optics block. The optics block is configured to present, at a time instant, to a left eye of a user of the head-mounted display apparatus, a first shifted version all of an image generated by the display screen. The first shifted version of the image has a first perceived center location that differs from the center of the display screen. The optics block is also configured to present, at the time instant, to a right eye of the user of the head-mounted display apparatus, a second shifted version of the image generated by the display screen, the second shifted version of the image having a second perceived center location that differs from the center of the display screen and that differs from the first perceived center location.

20 Claims, 10 Drawing Sheets

(56) References Cited

U.S. PATENT DOCUMENTS

| | | | |
|---|---|---|---|
| 6,262,743 B1* | 7/2001 | Allio | H04N 13/239 345/427 |
| 6,473,238 B1* | 10/2002 | Daniell | H04N 13/307 359/622 |
| 9,025,252 B2 | 5/2015 | Lewis et al. | |
| 9,213,163 B2 | 12/2015 | Lewis et al. | |
| 9,766,463 B2 | 9/2017 | Border et al. | |
| 10,282,912 B1* | 5/2019 | Yuan | G09G 3/02 |
| 2003/0067460 A1* | 4/2003 | Tomono | G02B 27/2214 345/419 |
| 2004/0106993 A1* | 6/2004 | Portney | A61F 2/1648 623/6.43 |
| 2006/0210111 A1 | 9/2006 | Cleveland et al. | |
| 2007/0018124 A1* | 1/2007 | Nishi | G02B 27/0025 250/559.36 |
| 2007/0165186 A1 | 7/2007 | Copner et al. | |
| 2009/0027772 A1 | 1/2009 | Robinson | |
| 2009/0040138 A1* | 2/2009 | Takahashi | G02B 27/22 345/32 |
| 2010/0086235 A1* | 4/2010 | Loughrey | G06K 7/14 382/312 |
| 2010/0245546 A1* | 9/2010 | Kuroki | G03B 35/10 348/49 |
| 2011/0304689 A1* | 12/2011 | Sezan | H04N 13/361 348/43 |
| 2012/0212499 A1 | 8/2012 | Haddick et al. | |
| 2013/0009993 A1 | 1/2013 | Horseman | |
| 2013/0182086 A1 | 7/2013 | Evans et al. | |
| 2013/0258463 A1 | 10/2013 | Evans et al. | |
| 2014/0153102 A1 | 6/2014 | Chang | |
| 2014/0253698 A1 | 9/2014 | Evans et al. | |
| 2015/0097759 A1 | 4/2015 | Evans et al. | |
| 2015/0177593 A1* | 6/2015 | Smeeton | G02F 1/37 362/259 |
| 2015/0212326 A1 | 7/2015 | Kress et al. | |
| 2015/0243068 A1* | 8/2015 | Solomon | G02B 27/017 345/419 |
| 2015/0331246 A1 | 11/2015 | Dewald et al. | |
| 2016/0109709 A1* | 4/2016 | Osterhout | G06F 3/013 359/614 |
| 2016/0195718 A1 | 7/2016 | Evans | |
| 2016/0195721 A1 | 7/2016 | Evans | |
| 2016/0195921 A1 | 7/2016 | Evans | |
| 2016/0198133 A1 | 7/2016 | Evans | |
| 2016/0291326 A1 | 10/2016 | Evans et al. | |
| 2016/0292921 A1 | 10/2016 | Evans et al. | |
| 2016/0295202 A1 | 10/2016 | Evans et al. | |
| 2016/0353093 A1 | 12/2016 | Lyon et al. | |
| 2017/0020661 A1* | 1/2017 | Cheatham, III | A61F 2/16 |
| 2017/0068311 A1 | 3/2017 | Evans et al. | |
| 2017/0139209 A9 | 5/2017 | Evans et al. | |
| 2017/0153672 A1 | 6/2017 | Shin et al. | |
| 2017/0160798 A1 | 6/2017 | Lanman et al. | |
| 2017/0171538 A1 | 6/2017 | Bell et al. | |
| 2017/0227770 A1* | 8/2017 | Carollo | G02B 27/0025 |
| 2017/0227771 A1 | 8/2017 | Sverdrup | |
| 2017/0242260 A1* | 8/2017 | Song | G02B 3/06 |
| 2017/0251181 A1 | 8/2017 | Smolyanskiy et al. | |
| 2017/0269353 A1 | 9/2017 | Xu | |
| 2017/0293148 A1* | 10/2017 | Park | G02B 27/0172 |
| 2017/0359570 A1* | 12/2017 | Holzer | G06T 11/60 |
| 2018/0003919 A1* | 1/2018 | Song | G06K 9/0061 |
| 2018/0045960 A1* | 2/2018 | Palacios | G02B 27/10 |
| 2018/0157055 A1* | 6/2018 | Sumi | G02B 30/27 |
| 2018/0213211 A1* | 7/2018 | Tomizawa | H04N 13/324 |
| 2018/0255290 A1* | 9/2018 | Holzer | H04N 13/221 |
| 2018/0348451 A1* | 12/2018 | Yamamoto | G02B 6/42 |
| 2019/0101866 A1* | 4/2019 | Georgiou | G03H 1/0248 |
| 2020/0117012 A1* | 4/2020 | Wen | G02B 27/0172 |

OTHER PUBLICATIONS

Extended European search report from European Application No. 19159958.8, dated Dec. 20, 2019.

* cited by examiner

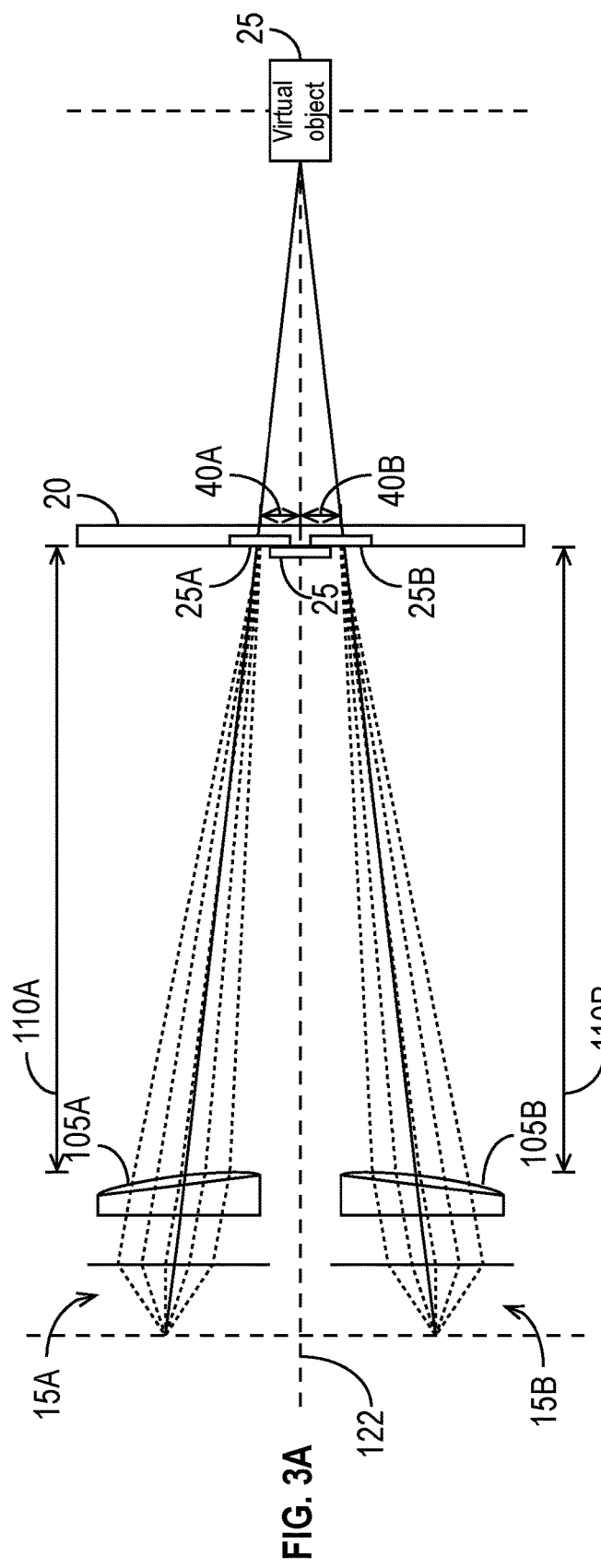
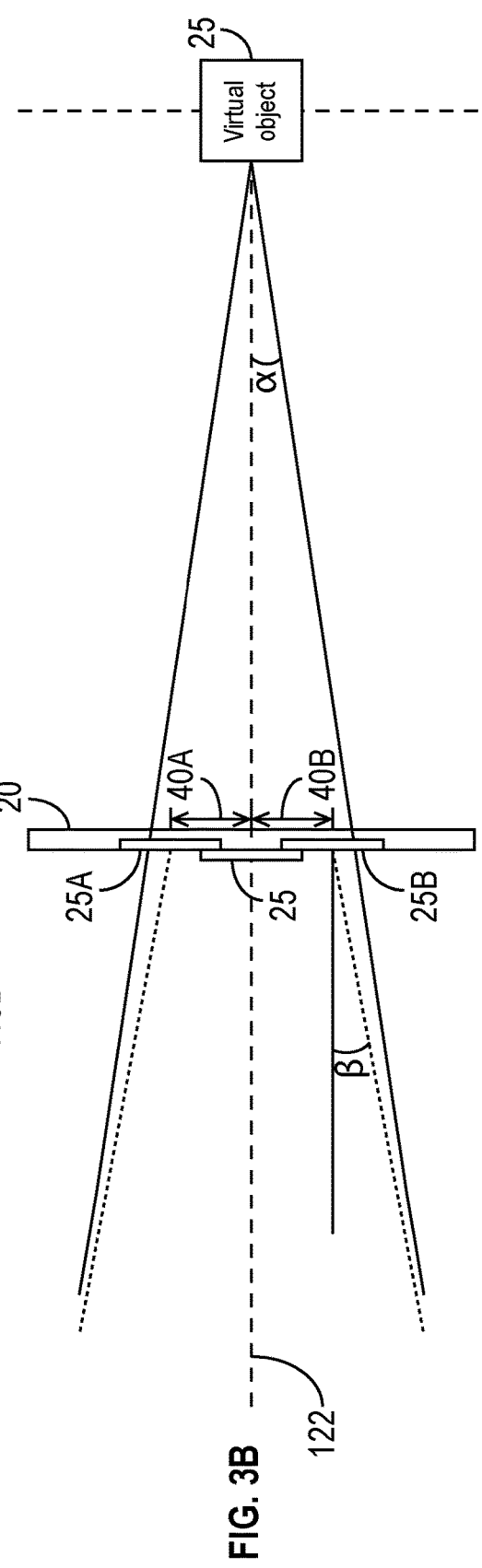
FIG. 3A
FIG. 3B

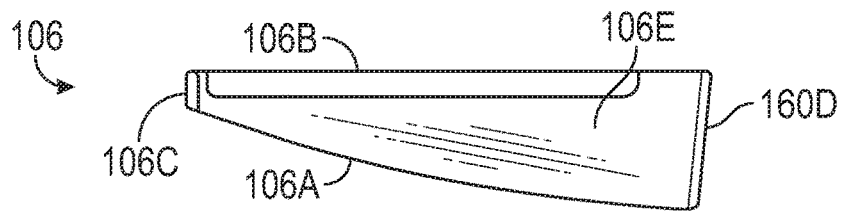
FIG. 4E
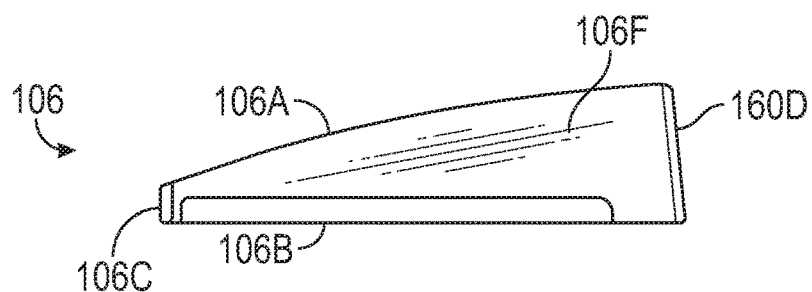
FIG. 4F
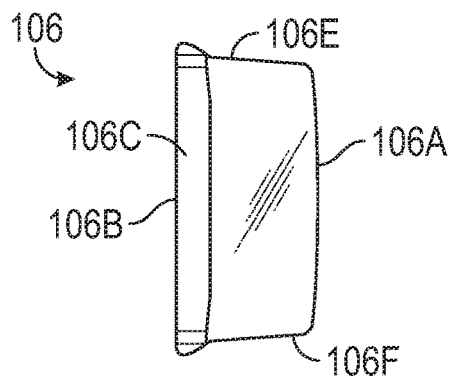 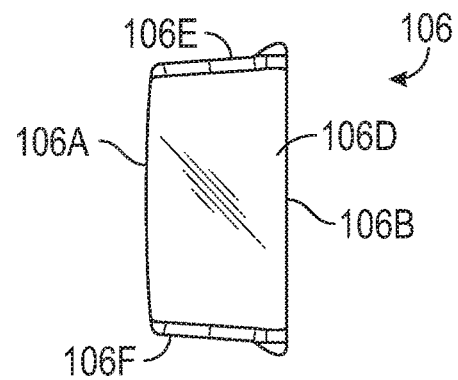
FIG. 4G            FIG. 4H
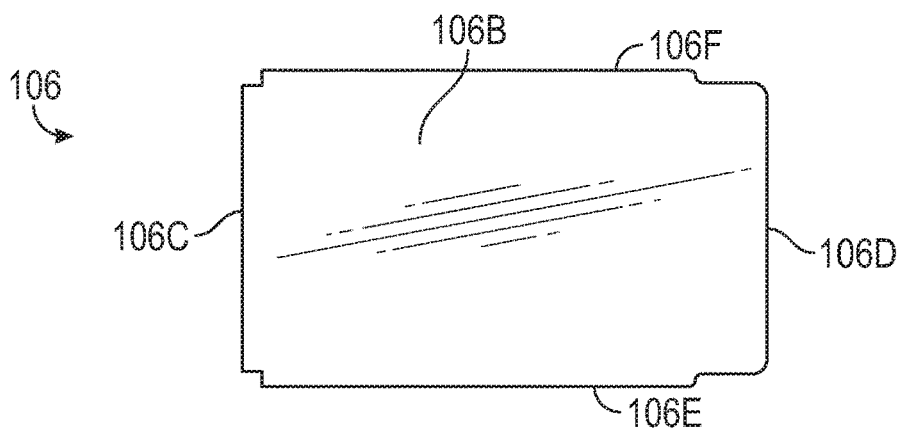
FIG. 4I

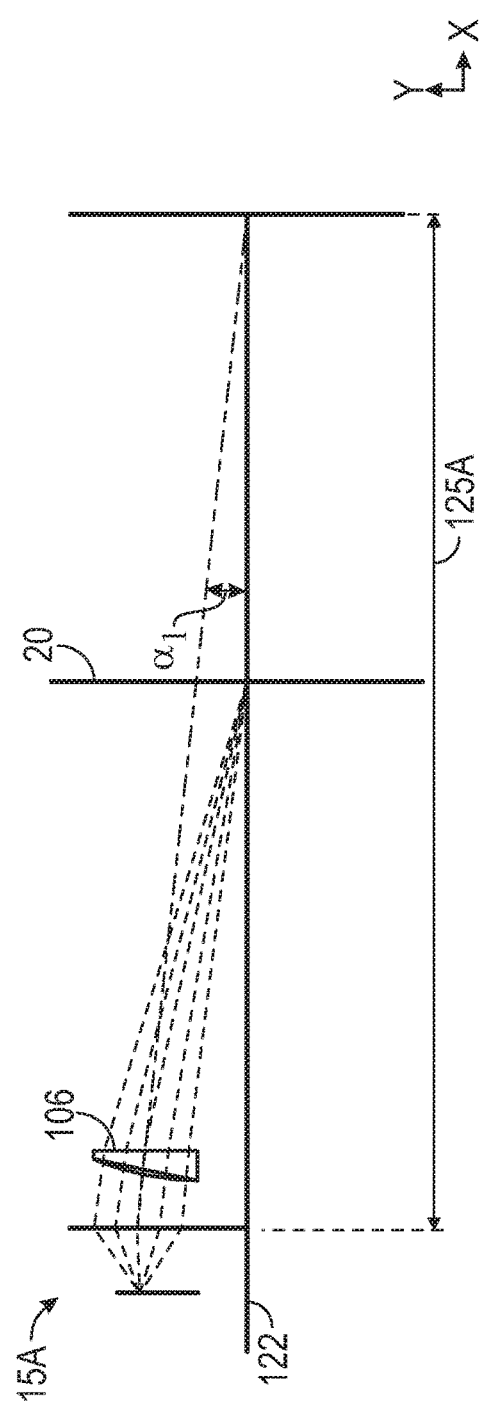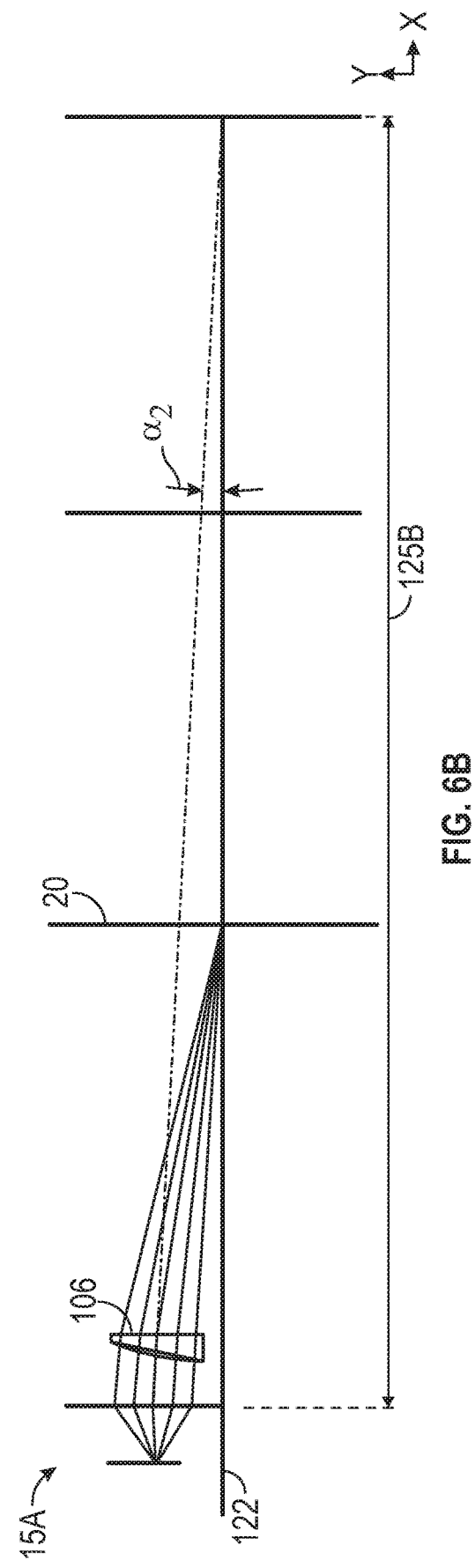

SINGLE-PANEL HEAD-MOUNTED DISPLAY

CROSS-REFERENCE TO RELATED APPLICATIONS

This application claims the benefit of, and hereby incorporates by reference the entirety of the contents of, China patent application No. 201810324925.X, filed Apr. 12, 2018 and entitled "SINGLE-PANEL HEAD-MOUNTED DISPLAY."

BACKGROUND

Head-mounted displays (HMDs) allow users to observe an image or a video signal through a pair of glasses, goggles, or a wearable headset. HMDs can be used to simulate a variety of virtual environments. For example, a HMD may include one or more electronic displays on which stereoscopic images can be displayed to simulate the illusion of depth, and head- or eye-tracking sensors can be used to estimate which portion of the virtual environment the user is viewing.

Vergence is the simultaneous movement or rotation of both of a person's eyes in opposite directions to maintain single binocular vision. The human eye naturally and automatically performs vergence. Accommodation is the process by which the eye changes its optical power to focus on an object as the distance between the object and the viewer varies. When a person views a real-world object, the location where the person is looking is where the person's eyes are verged and is also typically where the person's eyes are focused. In this case, the process of accommodation results in the distance at which the viewer's eyes are verged (the vergence distance) matching the distance at which the viewer's eyes are focused (the focal distance).

A mismatch between the vergence distance and the focal distance can arise for users of HMDs. Because it is desirable for a HMD to be compact, the display screen of the HMD is typically located fairly close to the user's eyes. But when the display screen renders a three-dimensional virtual object, that object appears to be located at a distance behind the surface of the display screen. Consequently, although the user's eyes are focused on the surface of the display screen, they are verged on a location behind the surface of the screen that corresponds to the position of the three-dimensional virtual object. Because the vergence distance in this example is different from the focal distance, the result is a vergence and accommodation conflict, which can cause discomfort, including visual fatigue and nausea.

Therefore, there is an ongoing need for HMDs that mitigate conflicts between vergence and accommodation.

SUMMARY

This summary represents non-limiting embodiments of the disclosure.

Disclosed herein are embodiments of single-panel HMDs that mitigate vergence and accommodation conflicts using novel optics. Unlike conventional HMDs, which present separate but identical images to the left and right eyes, the HMDs disclosed herein allow the same image to be presented to both eyes. A unique optics block shifts the perceived center of the image for the left and right eyes to locations that reduce vergence-accommodation conflict.

In some embodiments, a HMD apparatus comprises a display screen and an optics block. At a time instant, the optics block is configured to present, to a viewer's left eye, a first shifted version of the entirety of an image generated by the display screen, where the display screen generates only one image at a time. The first shifted version of the image has a first perceived center location that differs from the center of the display screen. At the same time instant, the optics block is configured to present, to the viewer's right eye, a second shifted version of the entirety of the image generated by the display screen. The second shifted version of the image has a second perceived center location that differs from the center of the display screen and that differs from the first perceived center location. In some embodiments, the distance between the display screen and the optics block is less than approximately 25 cm.

In some embodiments, the optics block comprises a first optical component having a first curved surface and a first flat surface, and a second optical component having a second curved surface and a second flat surface. In some such embodiments, the first and second optical components are identical. In some embodiments, the first and second curved surfaces are positioned to face a user of the HMD apparatus. In other embodiments, the first and second flat surfaces are positioned to face a user of the head-mounted display apparatus. In some embodiments in which at least one optical component includes a curved surface, the curved surface follows an arc of a circle having a radius between approximately 100 and approximately 115 mm.

In some embodiments, the length of the first or second optical component is between approximately 32 mm and approximately 38 mm. In some embodiments, the width of the first or second optical component is between approximately 18 mm and approximately 22 mm.

In some embodiments, the optics block comprises a lens having at least one surface with optical power, and a wedge. The wedge and the lens may be included in a monolithic unit, or they may be separate components. In some embodiments, the optics block comprises a prism, a diffractive surface, a corrective lens, or a mirror.

In some embodiments, the HMD apparatus further comprises an actuator configured to move the optics block. If present, the actuator may enable the viewer to move the optics block. If present, the actuator may be configured to move at least a portion of the optics block in a direction parallel and/or perpendicular to a center line. If present, the actuator may be configured to move a first portion of the optics block relative to a second portion of the optics block. If present, the actuator may be configured to rotate at least a portion of the optics block. If present, the actuator may include a mechanical component configured to enable a user of the HMD apparatus to adjust the distance between a first portion of the optics block and a second portion of the optics block and/or between at least a portion of the optics block and the display screen.

In some embodiments comprising an actuator, the HMD apparatus further comprises a processor coupled to the actuator, wherein the processor is configured to execute one or more instructions that, when executed, cause the processor to instruct the actuator to move the optics block.

In some embodiments, the first perceived center location corresponds to a first vergence angle and the second perceived center location corresponds to a second vergence angle, each of the first and second vergence angles being less than a focal angle corresponding to the center of the display screen. In some such embodiments, the first and second vergence angles are substantially identical.

In some embodiments, a distance between the optics block and the display screen is between approximately 50 and approximately 250 mm. In some embodiments, the optics block comprises first and second portions, and a distance between the first and second portions of the optics block is between approximately 55 mm and approximately 75 mm.

In some embodiments, the HMD apparatus further comprises a parallax barrier disposed between the display screen and the optics block. In some such embodiments, the parallax barrier comprises a slit, a liquid crystal display, or a lenticular display.

In some embodiments, a HMD apparatus comprises a display screen, a first optical component comprising a first curved surface and a first flat surface opposite the first curved surface, and a second optical component comprising a second curved surface and a second flat surface opposite the second curved surface. In some such embodiments, the first flat surface is positioned to face a left eye of a user of the head-mounted display apparatus, the second flat surface is positioned to face a right eye of the user of the head-mounted display apparatus, and a distance between the first and second optical components is user-adjustable. In some such embodiments, the first optical component is configured to present, at a time instant, to the left eye of the user of the head-mounted display apparatus, a first shifted version of an entirety of an image generated by the display screen, the image generated by the display screen being the only image generated by the display screen at the time instant, the first shifted version of the image having a first perceived center location that differs from a center of the display screen, and the second optical component is configured to present, at the time instant, to the right eye of the user of the head-mounted display apparatus, a second shifted version of the entirety of the image generated by the display screen, the second shifted version of the image having a second perceived center location that differs from the center of the display screen and that differs from the first perceived center location.

In some embodiments, a HMD apparatus comprises a display screen, a first optical component comprising a first curved surface and a first flat surface opposite the first curved surface, and a second optical component comprising a second curved surface and a second flat surface opposite the second curved surface, wherein the first curved surface is positioned to face a left eye of a user of the head-mounted display apparatus, the second curved surface is positioned to face a right eye of the user of the head-mounted display apparatus, and a distance between the first and second optical components is user-adjustable. In some such embodiments, the first optical component is configured to present, at a time instant, to the left eye of the user of the head-mounted display apparatus, a first shifted version of an entirety of an image generated by the display screen, the image generated by the display screen being the only image generated by the display screen at the time instant, the first shifted version of the image having a first perceived center location that differs from a center of the display screen, and the second optical component is configured to present, at the time instant, to the right eye of the user of the head-mounted display apparatus, a second shifted version of the entirety of the image generated by the display screen, the second shifted version of the image having a second perceived center location that differs from the center of the display screen and that differs from the first perceived center location.

BRIEF DESCRIPTION OF THE DRAWINGS

Objects, features, and advantages of the disclosure will be readily apparent from the following description of certain embodiments taken in conjunction with the accompanying drawings in which:

FIGS. 3A and 3B illustrate how the optics block reduces the difference between the vergence angle $\alpha$ and the focal angle $\beta$ by shifting the perceived center of an image rendered on a display screen for both the left eye and right eye, in accordance with some embodiments.

FIGS. 4A through 4I provide various views of an optical component of the optics block in accordance with some embodiments.

FIGS. 6A and 6B illustrate how the relative locations of the left-eye and right-eye portions of the optics block affect how the viewer perceives the distance to the virtual image rendered by the display screen and the vergence angle $\alpha$.

DETAILED DESCRIPTION

In connection with the appended drawings, the detailed description set forth below is intended as a description of various embodiments and is not intended to represent the only configurations or embodiments in which the concepts described herein may be practiced. The detailed description includes specific details for providing a thorough understanding of various concepts. It will be apparent to those skilled in the art that these concepts may be practiced without these specific details. In some instances, well-known structures and components are shown in block diagram form in order to avoid obscuring such concepts.

Figure 1A:
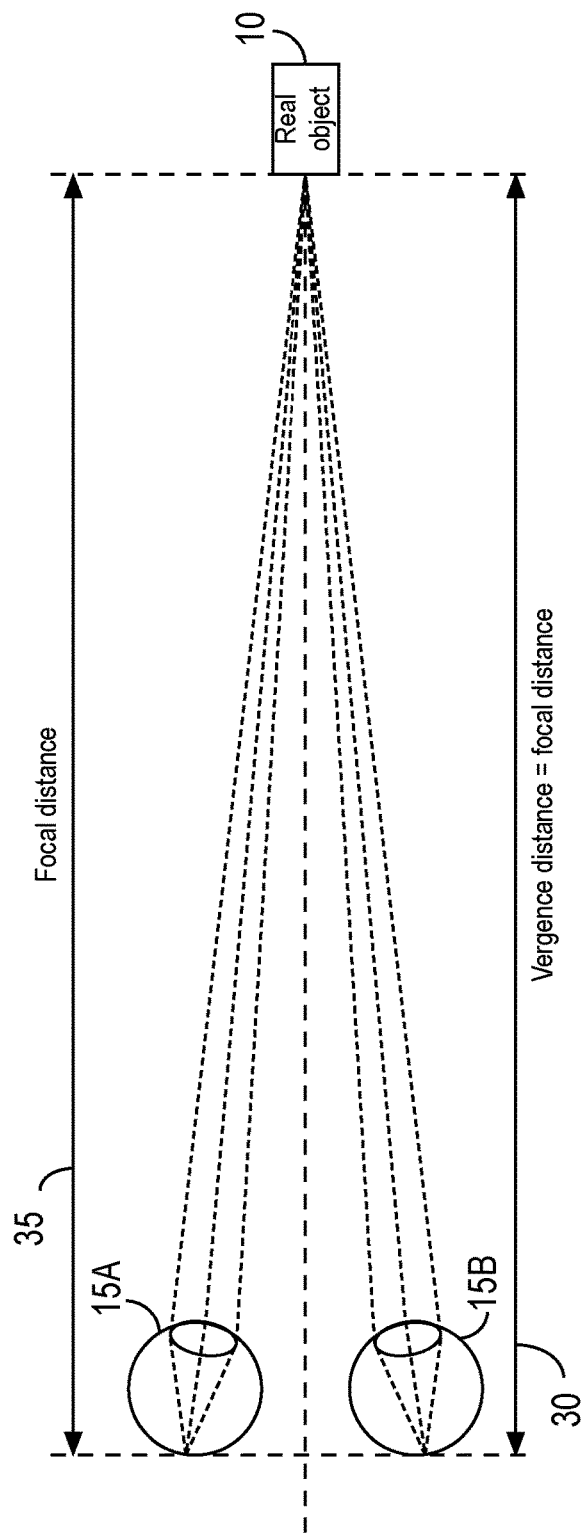
FIGS. 1A and 1B illustrate how the human eye experiences vergence and accommodation when viewing objects in the real world.
Figure 1B:
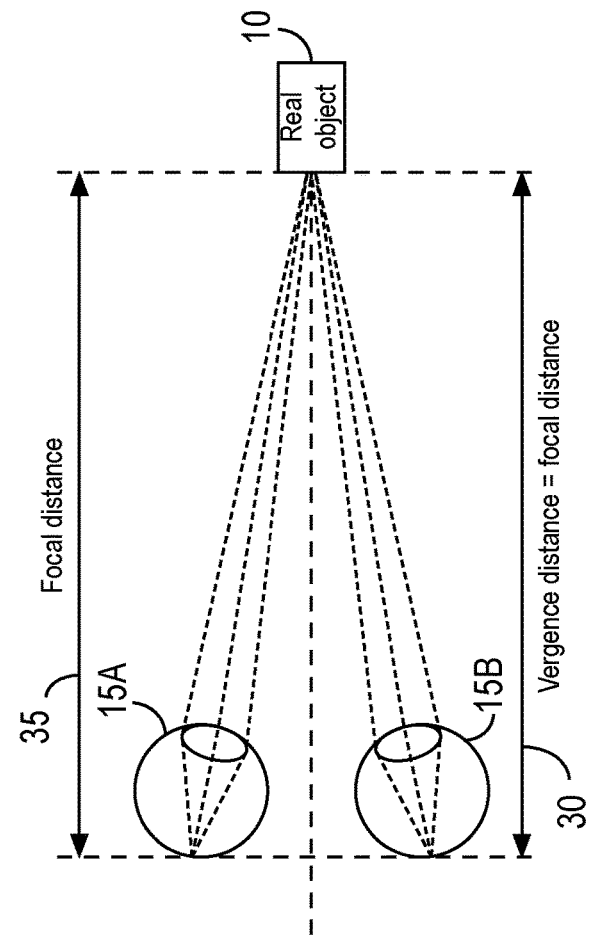

FIGS. 1A and 1B illustrate how the human eye experiences vergence and accommodation when viewing objects in the real world. In typical conditions, when a person looks at a real object, the eyes focus to look at the object at a particular distance. When the object moves closer (e.g., FIG. 1B) or further away (e.g., FIG. 1A), the eyes automatically rotate and change focus, which causes vergence and accommodation. In the example of FIG. 1A, the user is looking at real object 10 at a particular distance. The user's eyes 15A, 15B are verged on the real object 10, and gaze lines (shown as dashed lines) from the user's eyes 15A, 15B intersect at the real object 10. As shown in FIG. 1B, when the distance between the real object 10 and the person decreases, each eye 15A, 15B rotates inward to stay verged on the real object 10. As the real object 10 gets closer, the eyes 15A, 15B accommodate for the closer distance by reducing their power or focal length, which is accomplished by changing the shape of each eye. Thus, when a person views real-world objects, the vergence distance typically equals the focal distance. The viewer automatically and subconsciously adjusts the vergence of the eyes to look at an object, and the eyes focus to sharpen the retinal image. Because of the tight correlation in natural viewing, vergence and accommodation are neurally coupled. Accommodative changes evoke changes in vergence (accommodative vergence), and vergence changes evoke changes in accommodation (vergence accommodation).

Figure 1C:
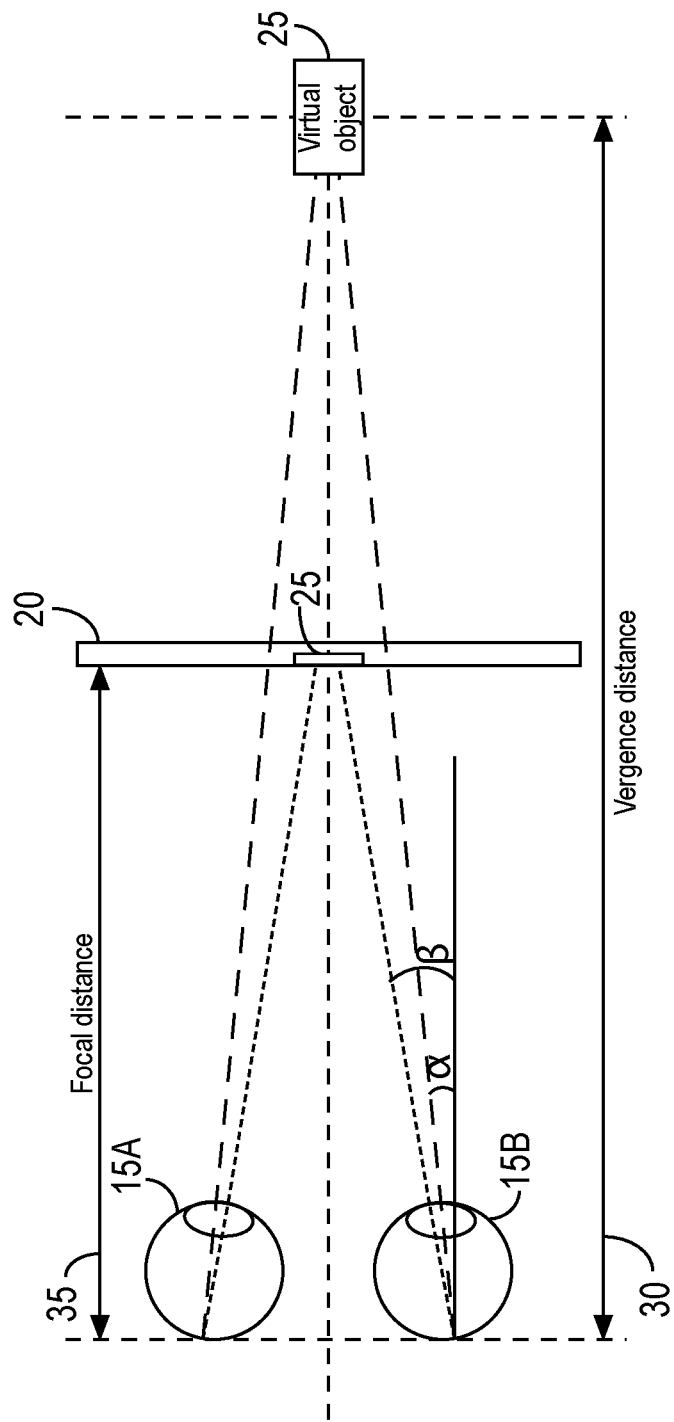
FIG. 1C shows an example conflict between vergence and accommodation that can occur with some prior-art three-dimensional displays.

FIG. 1C shows an example conflict between vergence and accommodation that can occur with some prior-art three-dimensional displays, such as those in existing HMDs that present the same single image to the left and right eyes. A HMD generally includes a display screen 20 (e.g., an array of pixels) and optics located between the eyes and the display screen (i.e., in front of each eye) to form the near-eye display. In the example illustrated in FIG. 1C, a user of a HMD is looking at a virtual object 25, which is rendered by the display screen 20. Each eye 15A, 15B rotates inward to stay verged on the virtual object 25, which appears to be at a distance that is behind the surface of the display screen 20 as illustrated by the long-dash gaze lines in FIG. 1C. Specifically, each of the eyes 15 rotates inward by a vergence angle α relative to the straight-ahead direction. But because the user is looking at and focused on the surface of the display screen 20, the focal distance of each eye 15A, 15B is less than the apparent distance from the viewer to the virtual object 25, and the focus angle β, relative to when the eyes 15A, 15B look straight ahead at a distant object, is larger than the vergence angle α. As a result, the focal distance 35 is the distance from the eyes 15A, 15B to the display screen 20, whereas the vergence distance 30 varies depending on the apparent location of the virtual object 25 being rendered by the display screen 20. To see the virtual object 25 clearly and without double vision, the user must counteract the neural coupling between vergence and accommodation to accommodate to a different focal distance 35 than the vergence distance 30 at which the eyes converge. The discrepancy between vergence distance 30 and focal distance 35 is referred to as "vergence-accommodation conflict." A user experiencing vergence-accommodation conflict may eventually experience some degree of fatigue and/or nausea as the user attempts to adjust vergence and accommodation appropriately. The severity or rapidity of onset of discomfort tends to increase proportionally to the difference between the vergence angle α and the focal angle β. Therefore, it is desirable to at least reduce the difference between the vergence angle α and the focal angle β.

One approach to mitigate the vergence-accommodation conflict in HMDs is to create what is essentially an isolated viewing environment for each of a user's eyes 15A, 15B by presenting separate images to the left eye 15A and the right eye 15B. The viewer is presented with two near-eye displays, namely, one for the left eye 15A and another for the right eye 15B. Each eye 15A, 15B focuses on its near-eye display. The eyes 15A, 15B then see two offset images whose optical paths cross to form a three-dimensional image. Typically, one micro-display (e.g., OLED, LCOS, etc.) or portable display (such as, for example, a smartphone screen that is split into two sections, etc.) is used as an image source along with suitable optics to form a separate virtual image viewable by each eye. Half of the pixels of the display screen 20 are used to present an image to the left eye 15A, and the other half of the pixels are used to present an image to the right eye 15B. A physical barrier prevents the left and right eyes 15A, 15B from seeing the image presented to the other eye. By isolating the eyes 15A, 15B from each other, this approach mitigates the vergence-accommodation conflict by reducing the focus angle β so that it more closely matches the vergence angle α. But because the display screen 20 must present separate images to the left eye 15A and right eye 15B, this approach effectively halves the resolution of the display screen 20. Furthermore, additional processing is required to generate the two images.

Disclosed herein are HMD embodiments that mitigate the vergence-accommodation conflict, but without the drawbacks in resolution or the processing requirements of conventional HMDs that use a single-panel display. Unlike prior-art approaches, the embodiments disclosed herein do not require separate images to be generated and displayed to a user's left and right eyes. On the contrary, the same single image is presented to both eyes, and novel optics shift where each eye perceives the center of the image to be, which reduces discomfort due to the difference between the focal distance and the vergence distance and the difference between the vergence angle α and the focal angle β. Consequently, the embodiments disclosed herein provide for HMDs with higher-resolution images than prior-art single-panel HMDs and do not require the additional processing of conventional single-panel HMDs to generate separate images for the left and right eyes.

In some embodiments, one or more characteristics (e.g., the power) of the optics block disposed between the user's eyes and a single-panel display can be adjusted dynamically, whether by the user or automatically, to reduce the difference between the vergence angle α and the focal angle β, thereby mitigating the vergence-accommodation conflict. In some embodiments, aspects of the left-eye and right-eye portions of the optics block are decoupled and may be adjusted individually.

Figure 2A:
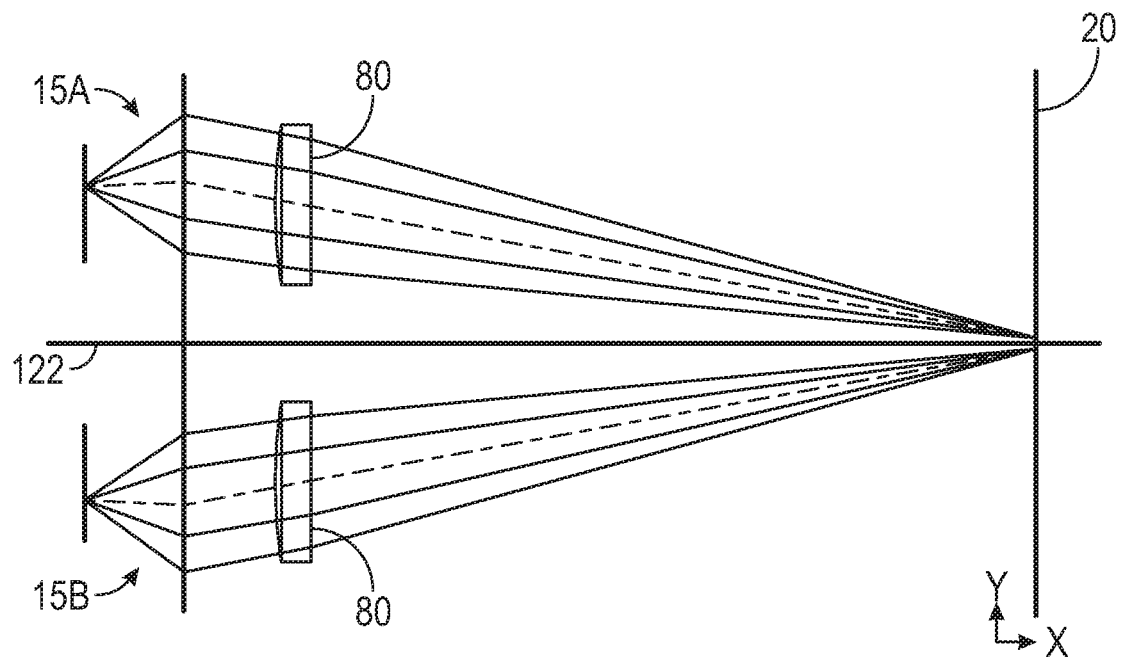
FIG. 2A illustrates some components of a prior-art HMD that uses conventional optics in the form of two lenses.

FIG. 2A illustrates some components of a prior-art HMD that uses conventional optics in the form of two lenses 80. As shown in FIG. 2A, each of the lenses 80 is between one of the user's eyes 15A, 15B and the display screen 20. Assuming that the viewer is focused on an object in the center of the display screen 20, the lenses 80 result in both eyes focusing on the same point of the display screen 20, namely the center. Thus, the location of the center of the display screen 20 as perceived by the left eye 15A with conventional optics is the actual center of the display screen 20, and the location of the center of the display screen 20 as perceived by the right eye 15B with conventional optics is also the actual center of the display screen 20.

Figure 2B:
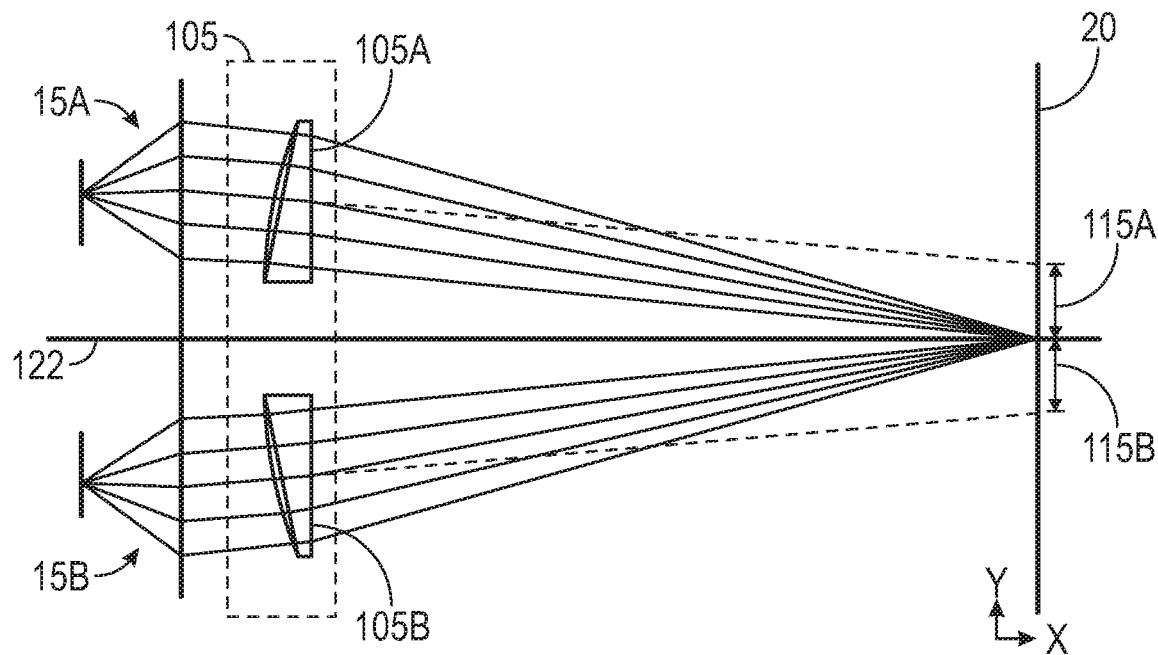
FIG. 2B illustrates how the novel optics block disclosed herein reduces vergence-accommodation conflict in accordance with some embodiments.

FIG. 2B illustrates some components of a HMD that uses a novel optics block 105 in accordance with some embodiments. The optics block 105 disclosed herein reduces vergence-accommodation conflict by shifting, for each of a viewer's eyes, the perceived location of the center of the display screen 20. As shown in FIG. 2B, a first portion 105A of the optics block 105 shifts where the left eye 15A perceives the center of the display screen 20. Specifically, the first portion 105A shifts the perceived center of the display screen 20 to the left of its actual location (i.e., with reference to the x-y axes shown in FIG. 2B, in the +y direction, perpendicular to the center line 122) by a distance 115A. Similarly, a second portion 105B of the optics block 105 shifts where the right eye 15B perceives the center of the display screen 20. Specifically, the second portion 105B of the optics block 105 shifts the perceived center of the display screen 20 to the right of its actual location (i.e., with reference to the x-y axes shown in FIG. 2B, in the −y direction, perpendicular to the center line 122) by a distance 115B. As a consequence, and as explained further in connection with FIGS. 3A and 3B, the vergence angle decreases.

FIGS. 3A and 3B illustrate how the optics block 105 disclosed herein reduces the difference between the vergence angle α and the focal angle β by shifting the perceived center of an image rendered on a display screen 20 for both the left eye 15A and right eye 15B. In the embodiment illustrated in FIG. 3A, the optics block 105 includes two portions, 105A for the left eye and 105B for the right eye, where each of the portions 105A, 105B may include one or more optical components, such as, for example, a lens, a wedge, etc. In some embodiments, one or both of the two portions 105A, 105B comprise a wedge and a lens having at least one surface with optical power. In such embodiments, the lens and wedge may be separate components, or they may be a single, monolithic component.

In the example of FIGS. 3A and 3B, the display screen 20 actually renders a virtual object 25 at the center of the display screen 20. (FIGS. 3A and 3B illustrate the virtual object 25 as slightly in front of the display screen 20 to enable the locations of the shifted virtual objects 25A, 25B to be seen clearly.) But, as shown in FIG. 3A, the optics block 105 shifts where each of the left and right eyes 15A, 15B perceives the location of the virtual object 25. Specifically, through a first portion 105A of the optics block 105, the left eye 15A perceives a shifted center location of the image presented by the display screen 20. As a result, the object 25, presumed to be in the center of the image, is shifted by a distance 40A to the left and appears as the object 25A. Likewise, through a second portion 105B of the optics block 105, the right eye 15B perceives a shifted center location of the image presented by the display screen 20. As a result, the object 25 is shifted by a distance 40B to the right of center and appears as the object 25B. In one embodiment, the perceived distance of the virtual object 25 from the viewer is approximately 500 mm.

FIG. 3B is a closer view of the right-hand portion of FIG. 3A to illustrate the effect of the shifted perceived center locations on the focal angle β. Because of the perceived shifts caused by the optics block 105, the discrepancy between the focal angle β and the vergence angle α is reduced in FIG. 3B relative to in the prior-art example shown in FIG. 1C.

It should be noted that although FIGS. 3A and 3B illustrate the first and second portions 105A, 105B of the optics block 105 being identical and symmetrically disposed about the center line 122, and therefore resulting in the magnitudes of the shifts being identical for the left and right eyes 15A, 15B, the focal angle β for the left eye need not be identical to the focal angle β for the right eye. For example, some users may have a more comfortable experience with the HMD if the focal angles are not exactly the same. The first and second portions 105A, 105B of the optics block 105 may differ in their characteristics (e.g., optical power) and/or location (e.g., placement relative to the center line 122, distance from the user, etc.).

Furthermore, it is to be appreciated that the vergence angle α and the focal angle β need not be made identical to improve the viewing experience for a user. In other words, it is not necessary for the optics block 105 to eliminate entirely the difference between the vergence angle α and the focal angle β for the left eye 15A or the right eye 15B, and thereby eliminate entirely the vergence-accommodation conflict. The optics block 105 provides a mechanism to reduce the difference between the vergence angle α and the focal angle β for each eye and thereby provide a more comfortable viewing experience by at least reducing vergence-accommodation conflict.

As shown in FIG. 3A, the first portion 105A is a distance 110A from the display screen 20, and the second portion 105B is a distance 110B from the display screen 20. In some embodiments, each of the distances 110A, 110B is less than approximately 25 cm. For example, in some embodiments, the distances 110A, 110B are between approximately 50 mm and approximately 250 mm. In a particular embodiment, the distances 110A, 110B are approximately 160 mm, which provides a comfortable viewing experience for virtual objects presented at a perceived distance of at least 1 meter.

Although FIG. 3A illustrates the first and second portions 105A, 105B of the optics block 105 being at approximately the same distance from the display screen 20 (i.e., the distance 110A is approximately equal to the distance 110B), the distances 110A and 110B need not be identical. For example, some viewers may have a more comfortable viewing experience if the distances 110A and 110B are different. In some embodiments, the distances 110A, 110B are adjustable. For example, a user may be able to manually adjust one or both of the distances 110A, 110B.

Unlike in prior-art approaches, the optics block 105 allows the display screen 20 to present a single high-resolution image to both eyes 15A, 15B. Magnification of the image light may increase a field of view of the displayed content. For example, the field of view of the displayed content may be such that the displayed content is presented using almost all (e.g., 150 degrees diagonal), and in some cases all, of the user's field of view.

As explained above, the perceived shift in the location of the center of the image presented by the display screen 20 may be achieved using a novel optics block 105. FIGS. 4A through 4I provide various views of an exemplary optical component 106 of the optics block 105 that may be used in accordance with some embodiments. As shown in FIGS. 4A through 4I, in some embodiments, the optical component 106 has a wedge-like shape.

Figure 4A:
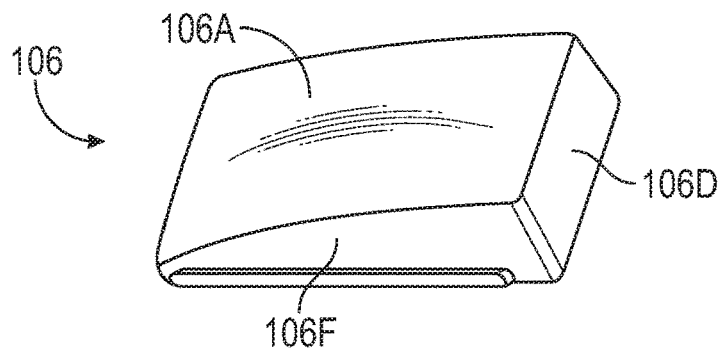
Figure 4B:
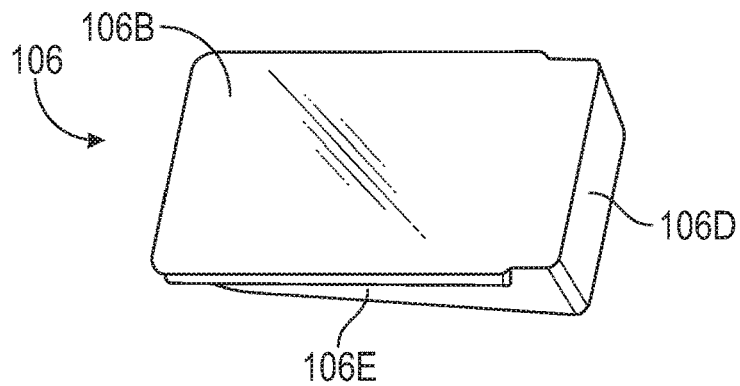

FIGS. 4A and 4B are perspective views of the exemplary optical component 106. FIG. 4A is a top, front perspective view that shows a surface 106A of the optical component 106. In the embodiment of the optical component 106 illustrated in FIG. 4A, the surface 106A has a curvature. In some embodiments, when installed in a HMD, the surface 106A is oriented away from the wearer of the HMD. In other embodiments, when installed in a HMD, the surface 106A is oriented toward the wearer of the HMD. Testing by the inventors has verified that the exemplary optical component 106 illustrated in FIGS. 4A through 4I works well for its intended purpose both when the surface 106A faces away from the wearer of the HMD and when the optical component 106 is flipped about a horizontal axis so that the surface 106A faces the wearer of the HMD.

FIG. 4B is a bottom, rear perspective view that shows the surface 106B of the optical component 106. The surface 106B is on the opposite side of the optical component 106 from the surface 106A. In the exemplary embodiment of the optical component 106 shown in FIG. 4B, the surface 106B is substantially flat. In other embodiments, the surface 106B has a curvature, which may be similar to, identical to, or different from the curvature of the surface 106A. In some embodiments, when installed in a HMD, the surface 106B is oriented toward the wearer of the HMD. In other embodiments, when installed in a HMD, the surface 106B is oriented away from the wearer of the HMD. As explained above, testing by the inventors has verified that the exemplary optical component 106 illustrated in FIGS. 4A through 4I works well for its intended purpose both when the surface 106B faces away from the wearer of the HMD and when the optical component 106 is flipped about a horizontal axis so that the surface 106B faces the wearer of the HMD.

Figure 4C:
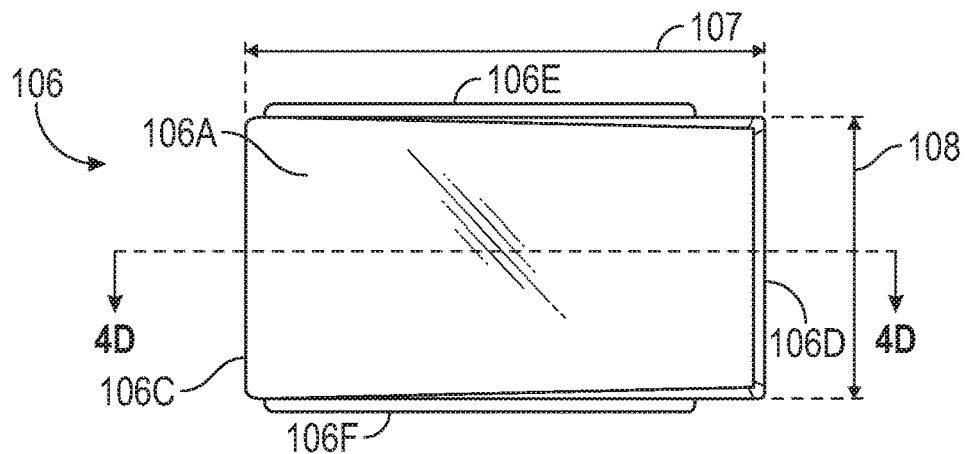

FIG. 4C is a top view of the optical component 106 (i.e., viewing the surface 106A straight on). In addition to the surface 106A, FIG. 4C shows the side surfaces 106C, 106D, 106E, and 106F. As shown in FIG. 4C, the optical component 106 has a length 107 (corresponding to the lengths of the side surfaces 106E and 106F) and a width 108 (corresponding to the side surfaces 106C and 106D), which may have any suitable values. For example, in some HMD embodiments, the length 107 is between approximately 32 and 38 mm, and the width 108 is between approximately 18 and 22 mm.

As shown in FIGS. 4A through 4C, one or both of the side surfaces 106E and 106F may include one or more protruding tabs or lips that facilitate the optical component 106 being held in place, for example, in a HMD. Alternatively or in addition, the side surfaces 106C and/or 106D may include one or more protruding tabs or lips. Alternatively or in addition, any of the side surfaces 106C, 106D, 106E, or 106F may include a slot, groove, hole, protrusion, or any other structural feature to facilitate attachment of the optical component 106 to a HMD or other housing.

Figure 4D:
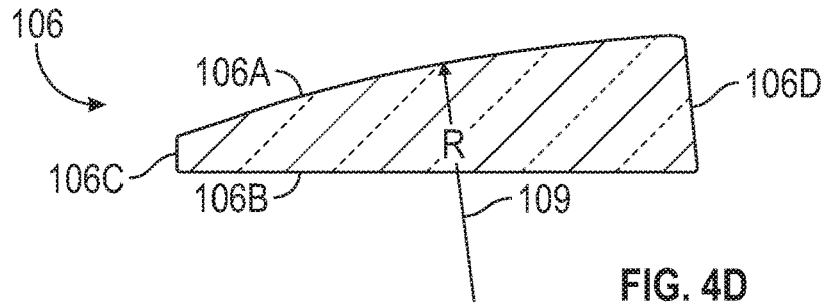

FIG. 4D is a cross-section of the optical component 106 taken through the dashed line labeled 4D-4D in FIG. 4C. FIG. 4D shows the surfaces 106A, 106B, 106C, and 106D. As illustrated in FIG. 4D (and FIG. 4A), in some embodiments, the surface 106A has a curvature. In some embodiments, including the exemplary embodiment of FIG. 4D, the curvature of the surface 106A can be characterized as an arc of a circle, where the circle has a radius (labeled "R" in FIG. 4D) 109. In some such embodiments, the radius 109 is between approximately 100 and 115 mm.

FIGS. 4E and 4F are, respectively, back and front views of the exemplary optical component 106, and FIGS. 4G and 4H are, respectively, left and right views of the exemplary optical component 106. FIGS. 4E through 4H illustrate the locations of the various surfaces 106A, 106B, 106C, 106D, 106E, and 106F of the optical component 106, as well as the protruding tabs or lips provided in this exemplary embodiment. FIG. 4I is a bottom view of the exemplary optical component 106.

The optical component 106 may be made of any suitable material that results in the optical component 106 providing the characteristics described herein. For example, the optical component 106 may comprise glass, plastic, polycarbonate, fluorite, zeonex, or even liquid interfaces.

The optical component 106 may be a monolithic component (i.e., consisting of one piece; solid or unbroken), or it may include multiple components coupled together (i.e., directly attached or connected together by one or more intervening components). For example, the optical component 106 may be a unitary, wedge-shaped piece. As another example, the optical component 106 may include a wedge-shaped portion and a separate portion (e.g., a lens) having some other shape. If included, the wedge-shaped piece or portion may include one or more curved surfaces (e.g., the surface 106A as shown in the exemplary embodiment of FIGS. 4A through 4I), or it may include one or more linear surfaces (e.g., the surface 106B as shown in the embodiment of FIGS. 4A through 4I).

Moreover, when the optical component 106 includes more than one element, the multiple elements may have different optical properties. For example, the optical component 106 may include one or more of: apertures, Fresnel lenses, convex lenses, concave lenses, filters, and so forth, all of which may have different optical properties.

In some embodiments, the optics block 105 comprises a prism, which may be, for example, a triangular prism or any other transparent optical element with flat, polished surfaces that refract light.

In some embodiments, the optics block 105 comprises a diffractive optical element (e.g., a diffractive lens, a Fresnel lens, a kinoform, a phased Fresnel lens, a holographic optical element, binary optics, a Fresnel zone plate, a hybrid lens (e.g., having combined refractive and diffractive power), etc.).

In some embodiments, the optics block 105 comprises a corrective lens (e.g., aspheric, bifocal, trifocal, hi-index, photochromic, polarized, polycarbonate, progressive, etc.). In some embodiments, the optics block 105 comprises a mirror. In some embodiments, one or more optical elements of the optics block 105 (e.g., the optical component 106) may have one or more coatings (e.g. as anti-reflective, blue-light reduction, scratch-resistant, UV protection, etc.).

The first and second portions 105A, 105B of the optics block 105 illustrated in FIGS. 2B and 3A may comprise the optical component 106, which may be the exemplary optical component 106 illustrated in FIGS. 4A through 4I. It is to be appreciated that, as explained above, in various embodiments, the optics block 105 may include components in addition to the optical component 106. Furthermore, the optics block 105 may include more than one of the optical component 106. For example, each of the first and second portions 105A, 105B may include a separate optical component 106. Each of these separate optical components 106 may be identical, or they may be different. For example, different optical components 106 may be provided for the left and right eyes 15A, 15B to accommodate differences between the left and right eyes 15A, 15B (e.g., astigmatism, myopia, etc.).

Figure 5:
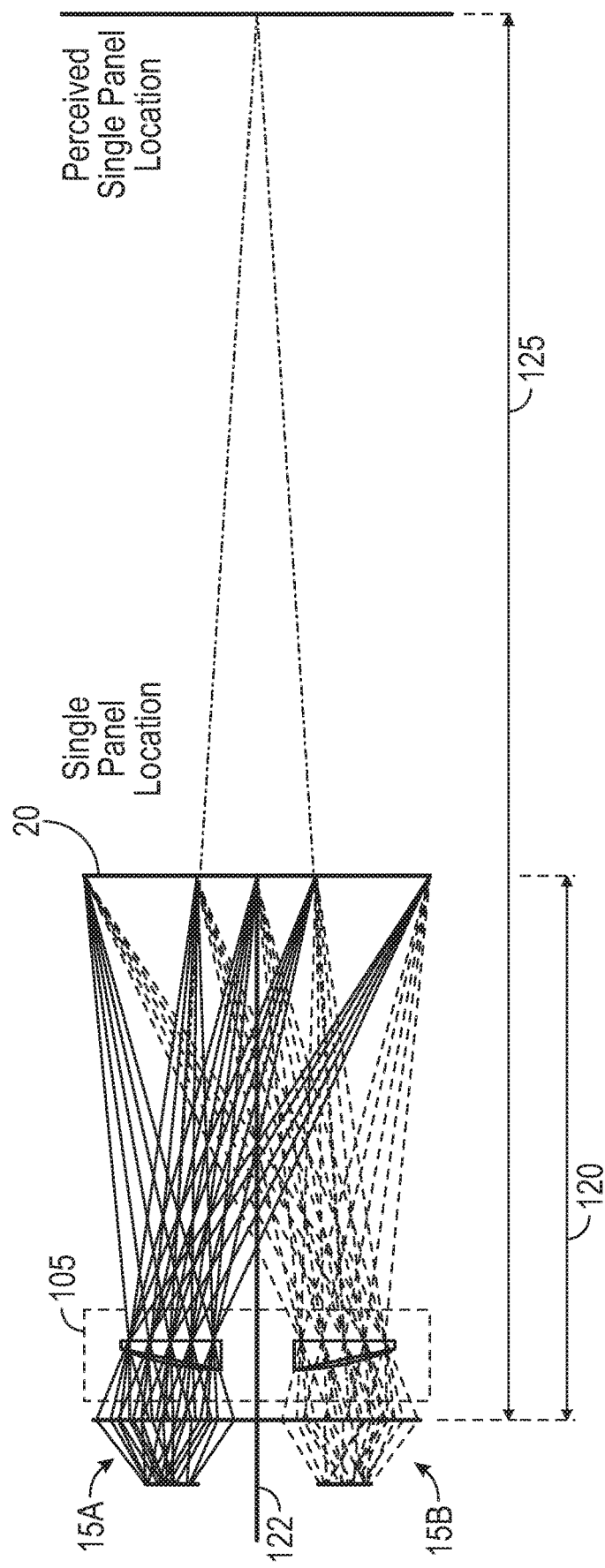
FIG. 5 illustrates the overall effect of the optics block on the viewer's experience in accordance with some embodiments.

FIG. 5 illustrates the overall effect of the optics block 105 on the viewer's experience, in accordance with some embodiments. The display screen 20 is located a distance 120 from the viewer's eyes 15A, 15B, which is where the viewer's eyes 15A, 15B focus. But because the optics block 105 shifts the locations where the left and right eyes 15A, 15B perceive the center of the display screen 20, the perceived location of the display screen 20 is a distance 125 from the viewer's eyes 15A, 15B.

The perceived distance 125 between the viewer and the display screen 20 can be adjusted in multiple ways. For example, in some embodiments, the amount by which the perceived location of the image on the display screen 20 shifts depends on the positions of the first and second portions 105A, 105B of the optics block 105 relative to the viewer's eyes 15A, 15B. In some such embodiments, the distance between the first and second portions 105A, 105B of the optics block 105 can be adjusted to change the perceived distance 125 between the viewer and the display screen 20. In other words, some or all of the optics block 105 may move in a direction parallel to the display screen 20 (i.e., approximately perpendicular to the center line 122). For example, with the optics block 105 illustrated in FIG. 5, decreasing the distance between the first and second portions 105A, 105B (i.e., moving one or both closer to the center line 122) reduces the vergence angle $\alpha$ because the perceived distance from the display screen 20 increases. Conversely, increasing the distance between the first and second portions 105A, 105B increases the vergence angle $\alpha$. In other embodiments of the optics block 105, the characteristics of the first and second portions 105A, 105B are such that decreasing the distance between the first and second portions 105A, 105B reduces the vergence angle $\alpha$, and increasing the distance between the first and second portions 105A, 105B increases the vergence angle α. In embodiments in which the distance between the first and second portions 105A, 105B may be adjusted, the first portion 105A may move relative to the second portion 105B, or the second portion 105B may move relative to the first portion 105A, or both portions 105A, 105B may move independently.

FIGS. 6A and 6B illustrate how the relative locations of the left-eye and right-eye portions of the optics block 105 along the y-axis (i.e., perpendicular to the center line 122) affect how the viewer perceives the distance to the virtual image rendered by the display screen 20 and the vergence angle α in some embodiments. For clarity, FIGS. 6A and 6B show only the portion of the optics block 105 for the left eye 15A. As will be appreciated by skilled artisans, the explanation also applies to the portion of the optics block 105 for the right eye 15B. In the embodiment illustrated in FIGS. 6A and 6B, the left-eye portion of the optics block 105 is the left portion 105A, which may be, for example, the optical component 106 described in the context of FIGS. 4A through 4I, with the surface 106A facing the viewer. In FIG. 6A, the optical component 106 is in a first position along the y-axis, and, as a result, the viewer perceives the image rendered by the display screen 20 to be at a distance 125A from the viewer's eye 15A. When the optical component 106 is in the illustrated position, the vergence angle is $α_1$. In FIG. 6B, the optical component 106 is in a second position along the y-axis. In the second position, the optical component 106 is closer to the center line 122 than in FIG. 6A, and, as a result, the viewer perceives the location of the image rendered by the display screen 20 to be at a distance 125B from the viewer's eye 15A, where the distance 125B exceeds the distance 125A. When the optical component 106 is in the illustrated position, the vergence angle is $α_2$, which is less than the vergence angle $α_1$. By adjusting the distance of the optical component 106 from the center line 122 (and, therefore, its position relative to the viewer's eye), the viewer can adjust the perceived location of the image rendered by the display screen 20 for the left eye 15A. Similarly, in some embodiments, the viewer can adjust the distance between the center line 122 and the right-eye optics portion of the optics block 105 of the HMD.

As another example of how the perceived image distance may be adjusted, in some embodiments the optical properties of one or more components of the optics block 105 can be adjusted to increase or decrease the vergence angle α. In some embodiments, the focus of some or all of the optics block 105 (e.g., one or more optical components 106) can also or alternatively be independently changed.

Figure 7A:
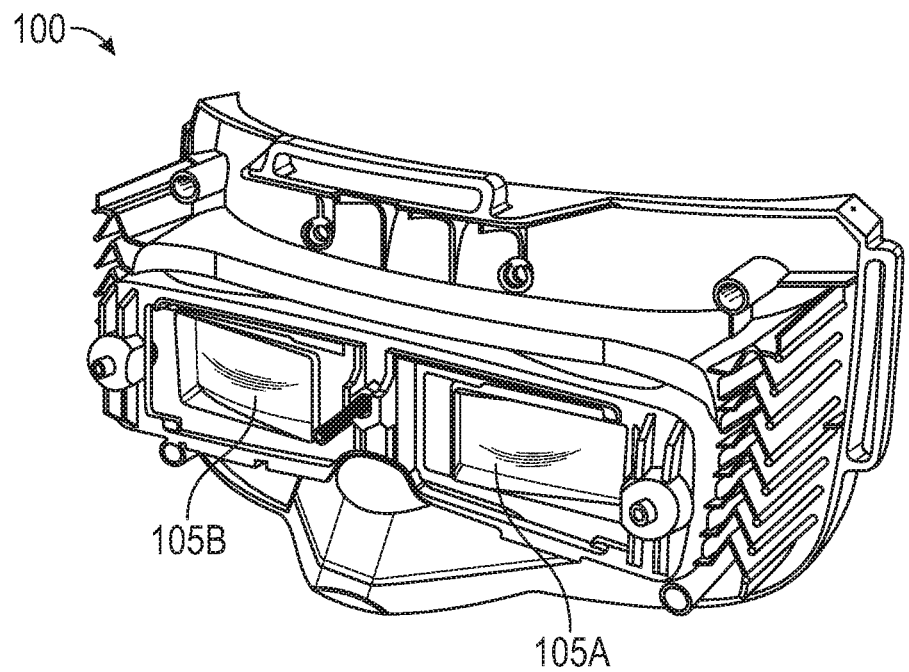
FIGS. 7A and 7B illustrate a portion of an exemplary HMD embodying an optics block in accordance with some embodiments.
Figure 7B:
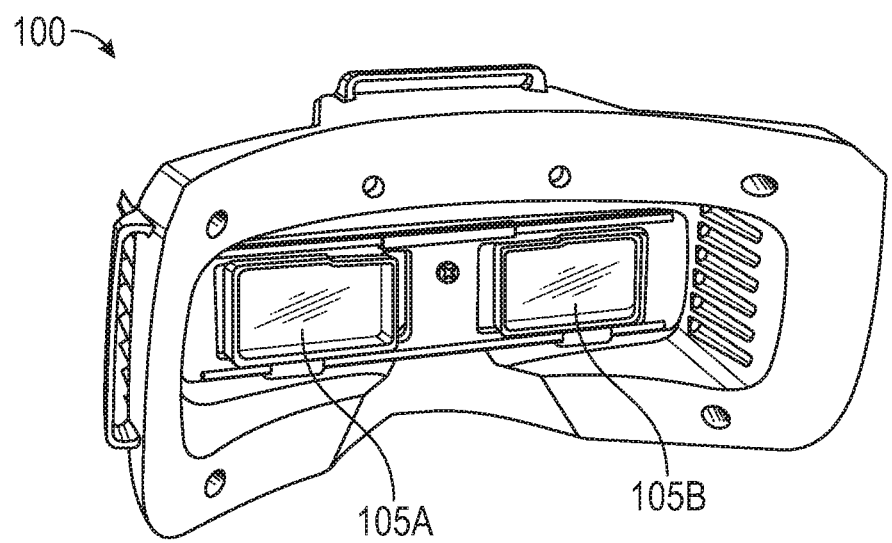

FIGS. 7A and 7B illustrate a portion of an exemplary HMD 100 embodying the optics block 105 in accordance with some embodiments. As illustrated in FIGS. 7A and 7B, the optics block 105 includes two portions 105A, 105B, one for each of the viewer's left and right eyes 15A, 15B. The portions 105A, 105B may comprise, for example, the optical component 106 described in the context of FIGS. 4A through 4I. As shown in FIGS. 7A and 7B, each of the portions 105A, 105B includes an outward-facing surface (FIG. 7A) and an inward-facing surface (FIG. 7B). In the embodiment of FIGS. 7A and 7B, the outward-facing surface has a curvature, and the inward-facing surface is flat. As explained previously, testing by the inventors has verified that the exemplary optical component 106 illustrated in FIGS. 4A through 4I also works well for its intended purpose when the curved surface 106A is the inward-facing surface and the flat surface 106B is the outward-facing surface (e.g., as illustrated in FIGS. 2B, 3A, 5, 6A, and 6B).

In some embodiments, the HMD 100 includes an actuator configured to receive a control signal and, in response, move at least a portion of the optics block 105, whether by moving the first portion 105A independently from the second portion 105B, or by moving both portions 105A, 105B together. The control signal may be, for example, an electric voltage or current, pneumatic or hydraulic pressure, or human power. When the control signal is received, the actuator 130 responds by converting the energy into mechanical motion.

Figure 8:
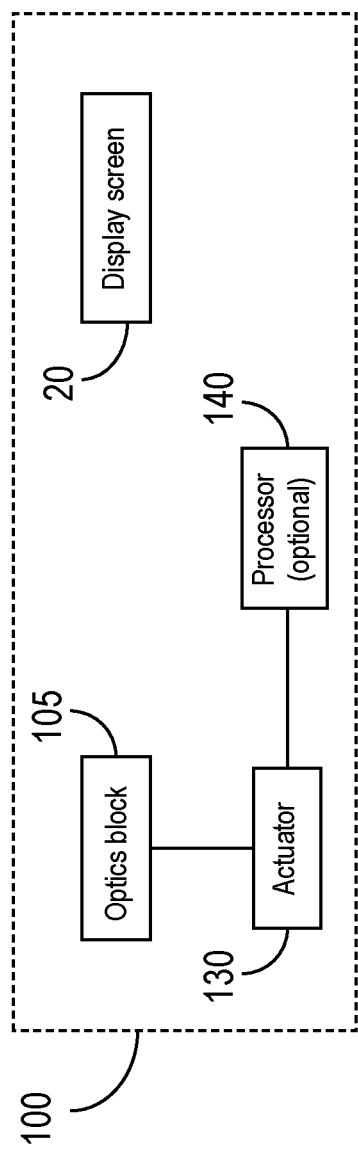
FIG. 8 is a block diagram illustrating a HMD in accordance with some embodiments.

FIG. 8 is a block diagram of a HMD 100 that includes an optics block 105, a display screen 20, an actuator 130, and an optional processor 140 coupled to the actuator 130. If present, the processor 140 may be configured to execute one or more instructions that, when executed, cause the processor 140 to instruct the actuator 130 to move a portion or all of the optics block 105. The actuator 130 may be, for example, a mechanical component that enables a user to move at least a portion of the optics block 105 manually. Examples of suitable mechanical components that may provide actuation include a rack and pinion, gears, rails, pulleys, and chains. The actuator 130 may additionally or alternatively include an electrical component. In embodiments in which the actuator 130 includes an electrical component, it may provide for automated movement of some or all of the optics block 105 (e.g., in response to instructions from a processor 140), or it may be controllable by a user.

In some embodiments, the HMD 100 includes an actuator 130 that enables a user to adjust one or more aspects of the optics block 105 to customize the user's viewing experience. For example, the actuator 130 may include an inter-pupillary distance (IPD) slider that allows the user to adjust the distance between the first and second portions 105A, 105B of the optics block 105 (i.e., in a direction perpendicular to the center line 122). In some embodiments, the user may adjust the distance between the first and second portions 105A, 105B of the optics block 105 to be in a range from approximately 55 mm to approximately 75 mm of separation between the optical centers of each eyepiece.

In some embodiments, the distance between the user's eyes and the optics block 105 may be adjusted using an actuator 130 (e.g., a mechanical component, an electromechanical component, etc., as described above). The actuator 130 may be the same actuator 130 described above or a separate actuator 130. In some embodiments, the actuator 130 is configured to move the optics block 105 (or one or both of the portions 105A, 105B) in a direction that is perpendicular to the display screen 20 and parallel to the center line 122. For example, the entire optics block 105 may be moved to adjust the distances 110A, 110B (FIG. 3A), or the first and/or second portions 105A, 105B may be moved independently to adjust one or both of the distances 110A, 110B.

In some embodiments, the actuator 130 is configured to rotate some or all of the optics block 105.

In some embodiments, the HMD 100 includes a processor 140 configured to execute one or more instructions that, when executed, cause a change in a property of the optics block 105. For example, the processor 140 may change a position, an orientation, an IPD, a refractive index, a thickness, or a permeability of a portion or all of the optics block 105.

The optics block 105 described herein has been constructed and validated to work for a variety of users.

In some embodiments, the display screen 20 comprises a parallax barrier. The parallax barrier may be, for example, a liquid crystal display (LCD) in which the crystals can create barriers that channel light. In some such embodiments, the placement and width of crystals in the parallax barrier may be adjusted such that different images are provided to the left and right eyes.

In some embodiments, the parallax barrier comprises a lenticular display. For example, the parallax barrier may include a ridged surface for directing different images to the left and right eyes. In some embodiments, the parallax barrier comprises an opaque layer with a series of slits configured to allow the left and right eyes to see different sets of pixels. A parallax barrier may be used in connection with the novel optics block 105 disclosed herein.

Figure 9:
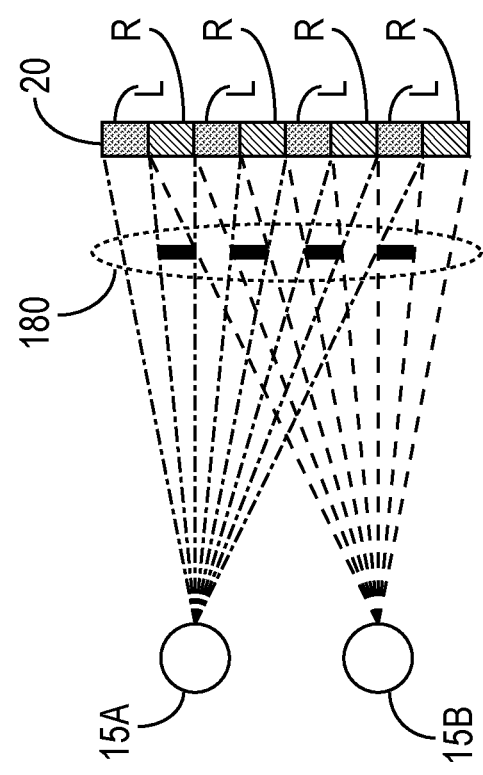
FIG. 9 illustrates a parallax barrier in accordance with some embodiments.

FIG. 9 illustrates an exemplary embodiment in which an exemplary parallax barrier 180 is disposed between the display 20 and the left and right eyes 15A, 15B. As illustrated in FIG. 9, the exemplary parallax barrier 180 is configured to allow the left eye 15A to see a first set of pixels of the display screen 20 (labeled "L") while blocking a second set of pixels (labeled "R"). Likewise, the exemplary parallax barrier 180 is configured to allow the right eye 15B to see the second set of pixels while blocking the first set of pixels. FIG. 9 is one example of a parallax barrier 180, and it is to be understood that other types of parallax barriers 180 could be used instead or in addition.

Several inventive embodiments have been described and illustrated herein, and those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

To avoid obscuring the present disclosure unnecessarily, well-known components of HMDs (e.g., frames, bands, interfaces, communication electronics, etc.) and display screens are not illustrated and/or discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the phrase "one or more," in reference to a list of one or more elements, should be understood to mean the same thing as "at least one."

It should also be understood that, unless clearly indicated to the contrary, in any methods claimed herein that include more than one step or act, the order of the steps or acts of the method is not necessarily limited to the order in which the steps or acts of the method are recited. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The term "coupled" is used herein to express a direct connection as well as a connection through one or more intervening parts or structures. Elements that are "communicatively coupled" are capable of communicating but are not necessarily physically coupled. The terms "exemplary" and "embodiment" are used to express examples, not preferences or requirements. The term "plurality" means "at least two." The abbreviation "e.g." means "for example." The abbreviation "i.e." means "that is."

Furthermore, the terms first, second, and the like in the description and in the claims are used for distinguishing between similar elements and not necessarily for describing a sequence, either temporally, spatially, in ranking, or in any other manner. It is to be understood that the terms so used are interchangeable under appropriate circumstances and that the embodiments of the invention described herein are capable of operation in other sequences than described or illustrated herein.

The drawings are not necessarily to scale, and the dimensions, shapes, and sizes of the features may differ substantially from how they are depicted in the drawings.

Reference to "one embodiment" or "an embodiment" means that a particular feature, structure or characteristic described in connection with the embodiment is included in at least one embodiment of the present invention. Thus, appearances of the phrases "in one embodiment" or "in an embodiment" are not necessarily all referring to the same embodiment, but may. Furthermore, the particular features, structures, or characteristics may be combined in any suitable manner, as would be apparent to one of ordinary skill in the art from this disclosure, in one or more embodiments.

Similarly it should be appreciated that in the description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, many of the claimed embodiments can be used in combination.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A head-mounted display apparatus, comprising:
   a display screen; and
   an optics block comprising:
   a first wedge-shaped optical component having a first curved surface and a first flat surface opposite the first curved surface, wherein the first wedge-shaped optical component is situated in the head-mounted display apparatus such that it is asymmetrical about a first axis extending through a center of the first wedge-shaped optical component, the first axis being perpendicular to the display screen and parallel to a center line of the head-mounted display apparatus, wherein the first wedge-shaped optical component is disposed in the head-mounted display apparatus to be situated between the display screen and a left eye of a user of the head-mounted display apparatus, and wherein the first wedge-shaped optical component is configured to present, at a time instant, to the left eye but not a right eye of the user, a first shifted version of an entirety of an image generated by the display screen, the image generated by the display screen being the only image generated by the display screen at the time instant, the first shifted version of the entirety of the image having a first perceived center location that differs from a center of the display screen, and
   a second wedge-shaped optical component having a second curved surface and a second flat surface opposite the second curved surface, wherein the second wedge-shaped optical component is situated in the head-mounted display apparatus such that it is asymmetrical about a second axis extending through a center of the second wedge-shaped optical component, the second axis being perpendicular to the display screen and parallel to the center line of the head-mounted display apparatus, wherein the second wedge-shaped optical component is disposed in the head-mounted display apparatus to be situated between the display screen and the right eye of the user, and wherein the second wedge-shaped optical component is configured to present, at the time instant, to the right eye but not the left eye of the user, a second shifted version of the entirety of the image generated by the display screen, the second shifted version of the entirety of the image having a second perceived center location that differs from the center of the display screen and that differs from the first perceived center location.

2. The head-mounted display apparatus recited in claim 1, wherein a distance between the display screen and the optics block is less than approximately 25 cm.

3. The head-mounted display apparatus recited in claim 1, wherein the first and second curved surfaces are positioned to face the user.

4. The head-mounted display apparatus recited in claim 1, wherein at least one of the first or second wedge-shaped optical component comprises:
   a lens having at least one surface with optical power; and
   a wedge.

5. The head-mounted display apparatus recited in claim 4, wherein the wedge and the lens are included in a monolithic unit.

6. The head-mounted display apparatus recited in claim 4, wherein the wedge and lens are separate components.

7. The head-mounted display apparatus recited in claim 1, further comprising an actuator configured to enable the user to move at least a portion of the optics block.

8. The head-mounted display apparatus recited in claim 7, wherein the actuator is configured to enable the user to move the at least a portion of the optics block in at least a direction parallel to or perpendicular to the center line.

9. The head-mounted display apparatus recited in claim 7, wherein the actuator is configured to enable the user to move a first portion of the optics block relative to a second portion of the optics block.

10. The head-mounted display apparatus recited in claim 7, wherein the actuator is configured to enable the user to rotate the at least a portion of the optics block.

11. The head-mounted display apparatus recited in claim 7, wherein the actuator comprises a mechanical component configured to enable the user to adjust a distance between at least a portion of the optics block and the display screen.

12. The head-mounted display apparatus recited in claim 1, wherein at least one of the first or second wedge-shaped optical components comprises a prism, a diffractive surface, a corrective lens, or a mirror.

13. The head-mounted display apparatus recited in claim 1, wherein the first perceived center location corresponds to a first vergence angle and the second perceived center location corresponds to a second vergence angle, each of the first and second vergence angles being less than a focal angle corresponding to the center of the display screen.

14. The head-mounted display apparatus recited in claim 1, wherein a distance between the optics block and the display screen is between approximately 50 mm and approximately 250 mm.

15. The head-mounted display apparatus recited in claim 1, further comprising:
a parallax barrier disposed between the display screen and the optics block, wherein the parallax barrier comprises a slit, a liquid crystal display, or a lenticular display.

16. The head-mounted display apparatus recited in claim 1, wherein:
the first flat surface is positioned to face the left eye of the user, and the second flat surface is positioned to face the right eye of the user, and
a distance between the first and second wedge-shaped optical components is user-adjustable.

17. The head-mounted display apparatus recited in claim 16, further comprising:
a parallax barrier disposed between the display screen and the optics block, wherein the parallax barrier comprises a slit, a liquid crystal display, or a lenticular display.

18. The head-mounted display apparatus recited in claim 1, wherein:
the first curved surface is positioned to face the left eye of the user, and the second curved surface is positioned to face the right eye of the user, and
a distance between the first and second wedge-shaped optical components is user-adjustable.

19. The head-mounted display apparatus recited in claim 18, further comprising:
a parallax barrier disposed between the display screen and the optics block, wherein the parallax barrier comprises a slit, a liquid crystal display, or a lenticular display.

20. The head-mounted display apparatus recited in claim 1, wherein the first and second flat surfaces are positioned to face, respectively, the left and right eyes of the user.

* * * * *